United States Patent [19]

Wu et al.

[11] Patent Number: 5,306,675
[45] Date of Patent: Apr. 26, 1994

[54] METHOD OF PRODUCING CRACK-FREE ACTIVATED CARBON STRUCTURES

[75] Inventors: Shy-Hsien Wu, Horseheads; Evelyn M. DeLiso, Corning, both of N.Y.

[73] Assignee: Corning Incorporated, Corning, N.Y.

[21] Appl. No.: 967,848

[22] Filed: Oct. 28, 1992

[51] Int. Cl.$^5$ .......................... B01J 37/34; B01J 20/20; B01J 20/28; B01J 20/26
[52] U.S. Cl. .......................................... 502/5; 34/1 P; 264/29.5; 502/402; 502/404; 502/416; 502/527
[58] Field of Search .................... 502/5, 402, 404; 264/29.5; 34/1 P, 4, 39

[56] References Cited

U.S. PATENT DOCUMENTS

| | | | |
|---|---|---|---|
| 3,201,330 | 8/1965 | Price | 264/29.7 |
| 3,290,790 | 12/1966 | Kunii | 34/9 |
| 4,001,028 | 1/1977 | Frost | 106/62 |
| 4,162,285 | 7/1979 | Tanabashi | 264/66 |
| 4,399,052 | 8/1983 | Sugino | 502/527 |
| 4,518,704 | 5/1985 | Okabayashi | 502/80 |
| 4,777,014 | 10/1988 | Newkirk | 419/12 |
| 4,837,943 | 6/1989 | Mizutani | 34/1 |
| 4,853,352 | 8/1989 | Newkirk | 501/88 |
| 4,866,857 | 9/1989 | Clasen | 34/10 |
| 4,972,658 | 11/1990 | Greenbank | 502/526 |
| 4,999,330 | 3/1991 | Bose et al. | 502/404 |
| 5,043,310 | 8/1991 | Takeuchi et al. | 502/404 |

FOREIGN PATENT DOCUMENTS

| | | | |
|---|---|---|---|
| 0466362 | 1/1992 | European Pat. Off. | 34/1 P |
| 47-80916 | 8/1972 | Japan . | |
| 53-121010 | 10/1978 | Japan . | |
| 151041 | 6/1991 | Japan | 502/404 |

OTHER PUBLICATIONS

Drying of Gelcast Ceramics, 26 *Ceramic Transactions* 101–107, The American Ceramic Society, Westerville, Ohio, 1992.

Primary Examiner—Paul E. Konopka
Attorney, Agent, or Firm—Angela N. Nwaneri

[57] ABSTRACT

A method of producing crack-free green activated carbon structures using a carbon matrix containing high gel strength binders such as methyl cellulose binders is disclosed. The invention also relates to a method of drying activated carbon structures by first contacting the structure with microwave radiation and then drying the structure in a conventional oven.

17 Claims, No Drawings

METHOD OF PRODUCING CRACK-FREE ACTIVATED CARBON STRUCTURES

BACKGROUND OF THE INVENTION

This invention relates to a method for producing crack-free activated carbon structures. It also relates to a method of reducing the the drying time of activated carbon green bodies without the formation of cracks, fissures and other deformations.

Certain metal and non-metal structures are produced from very fine metal, ceramic, glass and carbon powders and a high level of binders and water. Typically, due to the large surface area of the fine powders, the solid matrix requires the addition of a large amount of water sometimes more than 150 weight % based on the weight of powders in the matrix. As a result of the high water content of the matrix, structures formed from the matrix require very long drying times. In addition, structures formed from the matrix tend to develop cracks and fissures during the drying operation due to differential shrinkage. Consequently, the dimensional stability of such structures has remained largely unacceptable, resulting in a large number of such structures being rejected in the drying operation. This problem is particularly severe when forming complex structures such as thin-walled, honeycomb structures formed by extrusion.

Several methods have been suggested to improve the dimensional stability of formed structures. For example, in a composition comprising mainly inorganic powders and 10-30% water, it has been suggested to dry the article by first cooling the article to below 0° C. using either a cooling medium such as liquid nitrogen, acetone, dry ice or by use of freon gas freezer thereby completely freezing the water contained in the molded article, and subsequently removing the water through evaporation in the solid state by placing the completely frozen article in a vacuum of about $10^{-3}$ mmHg.

It has also been suggested to add substantial amounts of other components to the matrix to improve the dimensional stability of the formed articles. For example, it has been suggested to add 1 to 30 parts by weight of a graphite powder to 100 parts by weight of ceramic powder to form a ceramic article. The graphite is intended to reduce the amount of water needed to form the batch and thereby reduce the drying shrinkage and cracking. Others have suggested the addition of thermoplastic or thermosetting resins, and polyhydric alcohol. The above methods have the major disadvantage of adding substantially to the manufacturing cost of such articles due to the added steps of removing the resins or graphite by combustion at high temperatures and for long periods of time.

It is also well known in the art that total drying time can be reduced by raising the drying temperature and lowering the relative humidity of the drying medium. However, when this technique is applied to activated carbon bodies, particularly, large complex shaped bodies such as honeycomb structures, the bodies tend to crack during the drying operation.

Nothing in the background art has suggested a method of producing self-supporting, green activated carbon structures free of cracks and other deformations. It is therefore the object of the present invention to provide a method of producing green activated carbon structures from methyl cellulose-containing batches by which such structures become self-supporting and defect-free in a very short period of time.

SUMMARY OF THE INVENTION

Briefly, the present invention provides a method of producing crack-free, self-supporting green activated carbon bodies. In one aspect, the invention relates to a crack-free, shaped activated carbon body formed from a carbonaceous mixture having water content of 100-200% (based on the weight of carbon), and having 3-10 % cellulose ether binder.

In another aspect, the invention relates to a method of drying a formed activated carbon body by first contacting the formed body with electromagnetic radiation for a period of time sufficient to at least partially dry the article, and then placing the partially dried body in a conventional oven at a temperature of 60°-150° C. for a period of time sufficient to reduce the water content to less than about 15% of its original level.

DETAILED DESCRIPTION OF THE INVENTION

The primary objective of the present invention, that is, to provide a self-supporting, green activated carbon body which is free of cracks and fissures, can be achieved by providing a carbon batch or matrix which when shaped to form a green body, for example, by extrusion, will produce a body which is self-supporting and which will not crack or deform during drying.

In particular, the crack-free carbon body of the invention is formed by providing a carbon matrix comprising comprising 3-10% cellulose ether binder, 0.5-5% co-binder such as polyvinyl alcohol, and 100-200% super addition of water based on the weight of carbon; shaping the carbon matrix to form a green activated carbon body; and drying the green carbon body for a period of time sufficient to reduce the water content to less than about 15% of its original level.

The activated carbon matrix comprises carbon and/or carbon precursors, preferably, 75-85% of fine carbon powders having average particle size in the range of 3-10 microns, and 15-25% of coarse carbon powders having average particle size in the range of 20-50 microns. Any carbon powders or carbon precursors having the specified particle size properties can be used for the invention. Useful carbon for the invention include activated carbon such as Calgon ® Carbon BPL-F3 (a fine carbon powder available from Calgon, having average particle size of about 5 microns), and Nuchar ® SN-20 (a coarse carbon powder available from Westvaco, having average particle size of about 30 microns). In addition to activated carbon, commercially available carbon precursors such as various nut flours, rice hulls and saw dust can also be used for the activated carbon article of the invention.

We have found that the self-supporting article of the invention can be produced by using a carbon matrix which contains certain cellulose ether type binders and/or their derivatives, preferably, methylcellulose and/or its derivatives such as hydroxybutylmethylcellulose, hydroxypropylmethylcellulose, hydroxyethylmethylcellulose, sodium carboxymethylcellulose, and mixtures thereof. Preferred sources of cellulose ethers and/or derivatives thereof are the Methocel ® A-type binders available from Dow Chemical Company, the most preferred Methocel ® A-type binder being Methocel ® A4M, a methyl cellulose binder having a gel temperature of 50°-55° C., and a gel strength of 5000 g/cm² (based on a 2% solution at 65° C.).

Because of its high gel strength, the Methocel® A4M-containing article is relatively stiff as it is extruded, however, at room temperature, cracks and fissures may form in the article within hours of shaping because the binder does not develop sufficient gel strength at room temperature. Therefore, it is desirable to quickly develop a large gel strength as the article is formed or soon thereafter, so as to resist subsequent cracking due to drying shrinkage.

To aid the gelling of the Methocel® A4M and quickly develop sufficient gel strength, the article is placed in a drier using any schedule which will develop a large gel strength quickly as the article is formed. For example, the article can be dried at any temperature in the range of 60° to 150° C., preferably, 90°-100° C. Since the Methocel® A4M-containing article can be made to develop a large strength quickly to resist cracking, it can be dried at a fast rate (i.e., using a very short drying schedule) without formation of cracks.

As more fully discussed below, fast drying was initially demonstrated in several examples by placing the formed green honeycomb articles, measuring 1" diameter × 4" length (Samples 1-5), in a conventional oven at a temperature of 100° C. for a period of time sufficient to dry the article so that it will not crack or deform. In all cases, the samples, were completely dried in less than 4 hours. Subsequently, the drying experiments were expanded to test full size honeycomb structures (Samples 8-9), measuring about 2.75 inches in diameter and 6.5-7.5 inches long, and having 200 cpsi/12 mil wall geometry. As shown in the Examples, significantly faster drying times are obtained with Methocel® A4M (Sample 9), than with Methocel® K75M (Sample 8). Methocel® K75M is a hydropropoxyl cellulose binder, a K-type binder available from Dow Chemical Company, having very low gel strength (not measurable in a 2% solution at 65° C.), and gel point of 70°-90° C.

Any high intensity energy or electromagnetic radiation, such as microwave, dielectric etc., as well as conventional drier can be used to partially dry the formed article of the invention. In one particularly useful embodiment of the invention, after forming, the green (wet) body is contacted with microwave radiation (for example, by placing the article in a microwave oven) to quickly remove a portion of the water in the matrix. Since, as it is well known, a microwave oven tends to heat water uniformly, the initial heating of the body with microwave energy provides a more uniform drying, less differential shrinkage, and therefore, prevents cracking. However, it was observed that after a certain critical amount of the water in the matrix has been lost, arcing will occur and if the radiation is not discontinued, will destroy the structure. The critical level of water loss at which arcing will occur will depend on several factors including the initial amount of water in the matrix as well as the size of the formed article. In one set of experiments, as more fully described in the Examples below, the carbon batches were extruded into small cellular (honeycomb) samples measuring 4" in length and 1" diameter, having 300 cell/in² (46.5 cells/cm²) and wa;; thickness of about 10.5 mils (0.26 mm). When these samples were contacted with microwave energy by placement in a microwave oven, arcing was observed when the water content had dropped anywhere from about 20 to 60% of the original water content. As a result, it is suggested to contact the body with microwave radiation for a period of time sufficient to reduce the water content to 20-60% of its original level or just prior to arcing (as determined by experimentation for a given size and batch of material).

In another embodiment, after contacting the body with microwave radiation, it is placed in a conventional oven at 60°-150° C., to substantially complete the drying or reduce the water content to about 15% of its original level. By using the microwave oven to initially remove some of the water in the matrix, the drying time was substantially reduced as shown in the examples below (Sample 7). This mixed drying method, using both electromagnetic energy and a conventional oven, represents the best (shortest) complete drying of the carbon articles of the invention. The uniform and efficient microwave drying brings down the water content quickly and uniformly without the formation of cracks or fissures. For best results, the article should be removed from the microwave oven before arcing is observed as arcing may burn or damage the article. After the initial contact with microwave (electromagnetic) energy, the article is partially dry and rigid due to the good gel strength of the binder, and can therefore withstand relatively fast (aggressive) drying schedules in a conventional oven, without cracking.

The amount of the water content which can be removed by microwave radiation will vary depending on the size of the article and the composition of the batch.

EXAMPLES

Unless otherwise specified, the samples for the following examples were prepared from a batch using 80% Calgon® Carbon BPL-F3, 20% Westvaco Nuchar® SN-20, 6% Methocel® A4M or K75, 2% polyvinyl alcohol (Airvol® 205S available from Air Products), and 157% water (super addition based on weight of carbon). The mixture was mixed in a Brabender mixer at room temperature for two minutes at 50 rpm, extruded and dried. During the drying step, sample weights were measured every 30 minutes until drying was completed. The dried samples were then inspected for flaws such as cracks, fissures and splits.

A. Accelerated Drying

For the following set of experiments, the above mixture was extruded through a 1" diameter, 300 cpsi/10.5 mil die, and cut into 4" (length samples.

1. Binder

In this experiment, A4M was compared to Methocel® K75, a soft binder available from Dow Chemical Company, having a gel temperature of 70°-90° C. Samples 1 and 2 were prepared from carbon batches using A4M, while sample 3 was prepared using K75. All samples were dried in a conventional oven at 100° C. and the sample weights measured every 30 minutes to determine the residual water content. After drying, each sample was evaluated for surface flaws and other deformations.

TABLE 1

| | Residual Water (%) | | |
|---|---|---|---|
| Drying Time (Hr.) | 1 | 2 | 3 |
| 0 | 100 | 100 | 100 |
| 0.5 | 70.4 | 73.4 | 71.5 |
| 1.0 | 51.1 | 51.7 | 50.3 |
| 1.5 | 35.8 | 35.6 | 34.3 |
| 2.0 | 23.0 | 23.0 | 22.2 |
| 2.5 | 10.9 | 14.0 | 12.8 |
| 3.0 | 5.6 | 7.2 | 3.6 |

TABLE 1-continued

| Drying Time (Hr.) | Residual Water (%) | | |
|---|---|---|---|
| | 1 | 2 | 3 |
| 3.5 | 0.7 | 2.2 | 0 |
| 4.0 | 0 | 0 | |

Samples 1 and 2 showed minor strips and chips after about 2 hours of drying, while sample 3 split in two halves, a catastrophic failure.

2. Microwave Drying

In this experiment, for samples 4 and 5, 30 and 40 weight % respectively, of the water in the above composition was replaced with a commercial lubricant so that the total weight percent of water and lubricant was still 157%. Sample 6 (also containing 30 wt. % of a lubricant, and similar to Sample 4, but only 2" long), was dried in a microwave oven until arcing was observed. For comparative data, samples 4 and 5 were dried in a conventional oven.

TABLE 2

| Drying Time (Hr.) | Residual Water (%) | |
|---|---|---|
| | 4 | 5 |
| 0 | 100 | 100 |
| 0.5 | 67.2 | 64.8 |
| 1.0 | 43.5 | 41.2 |
| 1.5 | 26.5 | 24.0 |
| 2.0 | 13.8 | 11.8 |
| 2.5 | 4.9 | 3.5 |
| 3.0 | 0.3 | 0 |
| 3.5 | 0 | |

TABLE 3
(Sample 6)

| Drying Time (min.) | Residual Water (%) |
|---|---|
| 0 | 100 |
| 1.0 | 98.2 |
| 4.0 | 60.6 |
| 5.33 | 13.6* |

*arcing observed.

A seen above, in about 4 minutes the sample had dried to about 60% of its original water content, while it required about 30 minutes to achieve the same level of water loss (drying) in a conventional oven.

3. Combined Microwave and Conventional Drying

In this experiment, sample 7 (also 2 inches long), which was prepared form the same batch as sample 5 was first dried in a microwave oven to a residual water content of about 43.7%, but before any arcing was observed to avoid damage to the sample. The sample was then transferred to a conventional oven to complete the drying process. The time required to bring the water content to 43.7% of its original level using the microwave oven was only 2 minutes 17 seconds. After the sample was transferred to the conventional oven, it required only about 1 hour to bring the water content to about 1%. Thus, the drying time was reduced from about 2.5 hours for sample 5, to about 1 hour by using the combined method of this example. Little or no surface flaws were observed on the sample.

B. Full-Scale Driving

In the following experiments, mixtures were extruded into large honeycomb structures. Samples 8 and 9 were extruded through a 2.75" diameter, 200 cpsi/12 mil wall geometry, and cut into 6.5 and 7.5 inches in length respectively.

1. Binder

Sample 8 was extruded from a mixture containing 80% Calgon ® Carbon BPL-F3, 20% Westvaco Nuchar ® SN-20, 6% Methocel ® K75, 2% polyvinyl alcohol (Airvol ® 205S), and 157% water (super addition based on weight of carbon). For Sample 9, the Methocel ® K75 was replaced with Methocel ® A4M. The mixtures were mixed in a Muller mixer at room temperature, extruded and dried.

The Samples were dried using the following schedule:

Sample 8
Step 1: Heat from 30° to 70° C. in 42 hrs., at 95% RH;
Step 2: Hold at 70° C. for 48 hrs., at 95% RH;
Step 3: 95 to 50% RH in 48 hrs., at 70° C.; and
Step 4: Cool from 70° to 30° C. in 32 hrs., at 50% RH.

Sample 9
Step 1: Heat from 50° to 70° C. in 20 hrs., at 95% RH;
Step 2: Hold at 70° C. for 48 hrs., at 95% RH;
Step 3: 95 to 50% RH in 48 hrs., at 70° C.; and
Step 4: Cool from 70° to 30° C. in 32 hrs., at 50% RH.

As shown above, by replacing the low gel strength binder (Methocel ® K75) of Sample 8, with the higher gel strength binder of Sample 9 (Methocel ® A4M), the drying time was reduced from 170 hours to 148 hours, a 13% reduction in drying time. While the above schedule represents the optimized drying schedule for the low gel strength binder-containing batch of Sample 8, the schedule for Sample 9 was not optimized. Since the high gel strength binder of Sample 9 gels more quickly to resist distortion and cracking, it is believed that the drying time for Sample 9 can be significantly reduced by varying the drying temperature, and relative humidity of the conventional oven, for example, by increasing the initial drying temperature, speeding up the initial heat up rate, and accelerating the subsequent reduction of the relative humidity.

2. Microwave Drying.

In this experiment, three honeycomb samples measuring 2.75" diameter×7.5" long, and having cell wall geometry of 200 cells per square inch (31 cells per square centimeter) with internal wall about 12 mils (0.3 mm) thick, were initially dried in a microwave oven and then placed in a humidity controlled conventional ovens to complete drying.

Unlike the small samples where arcing was not observed until about 20 to 60% of the water content had been lost, in the large samples, arcing was observed at about 1 minute and 40 seconds, after a water loss of about 2%. The reason for this early arcing may be the fact that in this particular microwave oven, water loss from the skin of the sample was substantially faster than the loss from the inner portions of the honeycomb. While not intending to be bound by theory, I believe that the drying of large activated carbon samples with electromagnetic energy, such as microwave energy, can be improved or optimized to prevent such premature arcing, for example, by improving the uniformity of the microwave energy throughout the carbon body.

In addition to the embodiments discussed above, it should be understood that given the teachings herein, numerous alternatives and equivalents which do not depart from the present invention will be apparent to those skilled in the art, and are intended to be included within the scope of the present invention. It should also be understood that this invention is not to be unduly limited to the illustrative embodiments set forth herein.

We claim:

1. A method of producing a crack-free, dried activated carbon structure, the method comprising the steps of:

preparing a mixture comprising (a) carbonaceous particles selected from the group consisting of carbon, graphite and mixtures thereof, (b) 3–10% binder selected from methylcellulose, its derivatives, and mixtures thereof, (c) 0.5–5% polyvinyl alcohol, and (d) 100–200% super addition of water based on the weight of carbon;

forming the mixture into a shaped carbonaceous article; and drying the shaped article by first contacting the body with electromagnetic energy for a time sufficient to remove a portion of the water, and then placing the body in a conventional oven at a temperature of 60°–150° C. for a period of time sufficient to reduce the water content to less than about 15% of its original level, to form a crack-free activated carbon structure.

2. The method of claim 1, wherein the carbonaceous particles consist of 75–85% fine carbon powders having average particle size in the range of 3–10 microns, and 15–25% coarse carbon powders having average particle size in the range of 20–50 microns.

3. The method of claim 1, wherein the binder is selected from methylcellulose, hydroxybutylmethylcellulose, hydroxypropylmethylcellulose, hydroxyethylmethylcellulose, sodium carboxymethylcellulose, and mixtures thereof.

4. The method of claim 3, wherein the binder consists of methyl cellulose characterized by having a gel temperature of 50°–55° C. and gel strength of about 5000 g/cm$^2$ based on a 2% solution of the binder at 65° C.

5. The method of claim 1, wherein the mixture comprises 120–170% super addition of water based on the weight of carbon.

6. The method of claim 1, wherein the shaped carbonaceous article is dried in a conventional oven at a temperature of 90°–150° C.

7. The method of claim 1, wherein the activated carbon structure is in the shape of a honeycomb.

8. A method of producing a cellular activated carbon body comprising the steps of:

compounding carbon powders to form an activated carbon matrix comprising 75–85% of fine carbon powders having average particle size in the range of 3–10 microns, 15–25% of coarse carbon powders having average particle size in the range of 20–50 microns, 3–10% methylcellulose binder, 0.5–5% polyvinyl alcohol, and 120–170% water based on the weight of carbon;

shaping the carbon matrix into a honeycomb structure to form a green cellular carbon body comprising about 60% water by weight; and drying the green body to reduce the water content to less than about 15% of its original level by first contacting the body with electromagnetic energy for a time sufficient to remove a portion of the water, and then placing the body in a conventional oven at a temperature of 60°–150° C. for a period of time sufficient to reduce the water content to less than about 15% of its original level, to form a crack free carbon structure.

9. The method of claim 8, wherein the methyl cellulose binder is characterized by having a gel temperature of 50°–55° C. and a gel strength of about 5000 g/cm$^2$ based on a 2% solution of the binder at 65° C.

10. The method of claim 8, wherein the average particle size of the fine carbon powders is 5 microns.

11. The method of claim 8, wherein the average particle size of the coarse carbon powders is 30 microns.

12. The method of claim 8, wherein the carbon matrix comprises 2% polyvinyl alcohol.

13. The method of claim 8, wherein the carbon matrix comprises 6% methyl cellulose binder.

14. The method of claim 8, wherein the conventional oven temperature is in the range of 90°–100° C.

15. The method of claim 8, wherein the conventional oven temperature is in the range of 90°–150° C.

16. The method of claim 15, wherein the electromagnetic radiation is microwave radiation.

17. The method of claim 15, wherein the conventional oven temperature is in the range of 90°–100° C.

* * * * *

UNITED STATES PATENT AND TRADEMARK OFFICE
CERTIFICATE OF CORRECTION

PATENT NO. : 5,306,675

DATED : April 26, 1994

INVENTOR(S) : Shy-Hsien Wu and Evelyn M. DeLiso

It is certified that error appears in the above-identified patent and that said Letters Patent is hereby corrected as shown below:

Col. 3, line 63, "wa¢¢" should be "wall"

Col. 4, line 47, insert ")" after "(length"

Col. 5, line 50, "form" should be "from"

Col. 5, line 65 "Driving" should be "Drying"

Signed and Sealed this

Sixth Day of September, 1994

Attest:

BRUCE LEHMAN

Attesting Officer     Commissioner of Patents and Trademarks